July 16, 1968    W. HERRMANN ET AL    3,393,005
SPRING SUPPORT FOR A TILTABLE TRACTOR CAB
Filed May 6, 1966
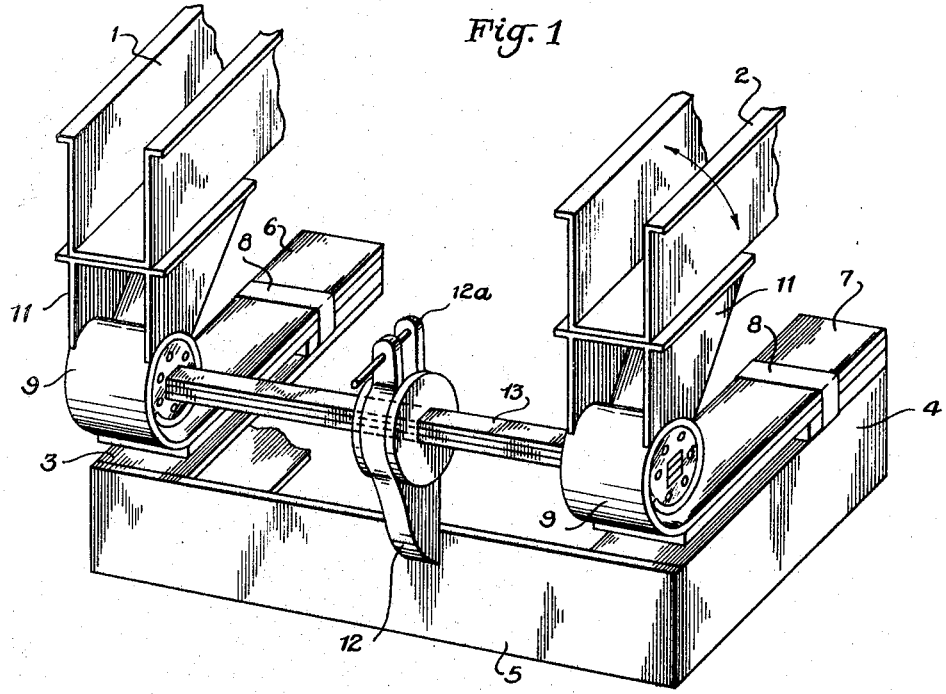
Fig. 1
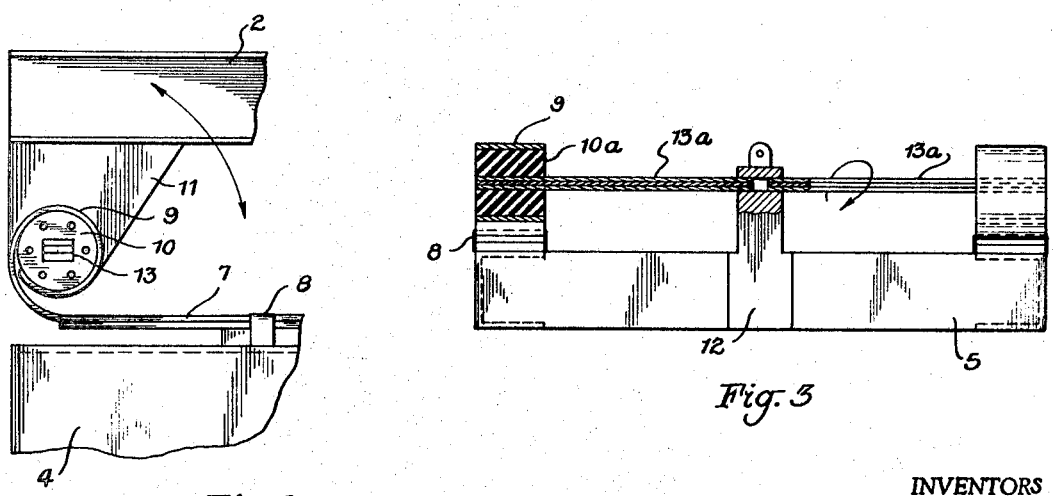
Fig. 2
Fig. 3
INVENTORS
Wilhelm Herrmann
Franz Augsburger
BY Bailey, Stephens and Huettig
ATTORNEYS 3,393,005
SPRING SUPPORT FOR A TILTABLE
TRACTOR CAB
Wilhelm Herrmann, Munich, and Franz Augsburger,
Puchheim, Germany, assignors to Maschinenfabrik
Augsburg-Nurnberg Aktiengesellschaft, Munich,
Germany
Filed May 6, 1966, Ser. No. 548,305
Claims priority, application Germany, May 8, 1965,
M 65,174
3 Claims. (Cl. 296—28)

ABSTRACT OF THE DISCLOSURE

A tiltable vehicle cab is initially supported by a pair of vertically acting leaf springs fastened to the vehicle frame. A torsion spring bar under tension is secured between the leaf springs and serves as the longitudinal tilting axis for the cab. This balances the weight of the cab when it is tilted out of running position.

This invention relates to a spring support for a tiltable cab of a vehicle tractor and, in particular, relates to a spring support in which a torsion spring is used for the tilting axis.

In this invention, the tiltable cab is initially supported on the vehicle frame by vertically acting springs and the rear end of the cab is provided with a latch for removably fastening the cab to the vehicle frame. An additional torsion bar spring serves as the longitudinal axis extending transversely of the vehicle frame and is used for balancing the weight of the cab when it is tilted out of running position.

The object of this invention is to produce a simple balancing spring mechanism which does not materially interfere with the vertically acting springs when the cab is latched in its running position.

In general, the object of this invention uses a torsion bar spring for balancing the weight of the cab. This torsion bar spring is preferably a leaf spring having its ends fastened to the cab frame and its center portion fastened to the vehicle frame and lying on the tilting axis of the cab. When the cab is latched in running position, the torsion spring is twisted to produce a torsion force so that, when the cab is unlatched and tilted, the spring tends to balance the weight of the cab and assists in the tilting of the cab.

The means by which the objects of the invention are obtained are described more fully with reference to the accompanying drawings in which:

FIGURE 1 is a schematic perspective view of the spring support;

FIGURE 2 is a side view of FIGURE 1; and

FIGURE 3 is a plan view showing a modification of the invention.

The tractor cab is adapted to be carried by the cab beams 1 and 2. The vehicle frame is composed of the longitudinally extending beams 3 and 4 which are connected by a crossbeam 5. A pair of leaf springs 6 and 7 having their rearward ends attached by straps 8 to beams 3 and 4, respectively, have their forward ends bent into eyes 9 and form the vertically acting spring supports for the cab. Each eye contains a block 10 which has radial play within the eye and, if needed, has a collar of abrasion resistant material. This block is connected to a bracket 11 which is joined to the cab frame beams 1 and 2, respectively. Fastening means 10a in the blocks 10 secure the ends of a laminated leaf spring 13 which is a torsion bar spring extending in the tilting axis of the cab. The middle portion of torsion spring 13 is held by a post 12 fixed to crossbeam 5 of the vehicle frame so that the middle portion of spring 13 cannot turn.

The spring 13 is initially installed in post 12 untwisted and at an angle to the latched running position of the cab. In this untwisted state, spring 13 functions to at least partially balance the weight of the cab and holds the cab tilted toward the front and out of running position. When the cab is swung down into running position and latched to the vehicle frame, then the spring 13 is twisted around its longitudinal axis to produce a torsion force and lie as horizontally as possible. In this position, the cab is carried by the vertically acting vehicle frame springs 6 and 7 and movements of these springs are not materially interfered with by the torsion spring because the spring 13 is stressed toward a twisted state and is still relatively movable and soft toward the vertical spring movements despite the torsion force in spring 13. When the cab is unlatched, then the balancing effect of the spring 13 when being untwisted tends to rotate the cab into tilted out-of-running position.

Modifications are possible within the basic concept of the invention. For example, coil springs, rubber springs or the like can be substituted for the vehicle frame springs 6 and 7. Also, as shown in FIGURE 3, two half springs 13a can be used instead of the single continuous leaf spring 13 and, in which case, the inner ends of the springs are secured to the post 12. Again, a single one-leaf torsion bar spring can be used instead of the laminated spring. In order to use conventional parts as much as possible, the spring 13 can be initially installed untwisted insofar as the twisting of the spring when the cab is latched in running position will not unduly affect the movements of springs 6 and 7. This means that the cab, while using spring 13 as a balancing spring, is tilted only a small amount to keep the spring 13 relatively soft in vertical movement. The initial position of torsion spring 13 can be pre-set by the use of a clamp 12a on post 12 by means of which the angle of spring 13 can be adjusted.

Having now described the means by which the objects of the invention are obtained, we claim:

1. A spring support for a cab tiltably mounted on the frame of a vehicle tractor comprising a vehicle tractor frame, a cab frame carrying the cab, a pair of vertically acting leaf springs secured to said vehicle frame and having vertically movable eye ends secured to and supporting said cab frame, laminated torsion spring means mounted in said eye ends and forming the axis around which said cab is turned from running position to open tilted position, and said torsion spring means being placed under torsion force when said cab is in running position so that said torsion spring means tends to balance the weight of the cab when the cab is tilted.

2. A support as in claim 1, further comprising bracket means secured to said eye ends for supporting said cab frame.

3. A support as in claim 2, further comprising adjustable clamping means for fastening said torsion spring means to said vehicle tractor frame and for pre-setting the initial position of said torsion spring means.

References Cited

UNITED STATES PATENTS

| | | | |
|---|---|---|---|
| 231,070 | 8/1880 | Magner et al. | 267—25 |
| 2,740,622 | 4/1956 | Hickman | 267—25 |
| 2,864,121 | 12/1958 | Imber et al. | 267—57 X |
| 2,951,548 | 9/1960 | Crockett et al. | 180—89 |
| 2,977,132 | 3/1961 | Bainbridge | 267—57 X |
| 3,276,762 | 10/1966 | Thomas. | |

FOREIGN PATENTS 992,604  5/1965  Great Britain.

BENJAMIN HERSH, *Primary Examiner.*

J. A. PEKAR, *Assistant Examiner.*